(12) United States Patent
Zhou et al.

(10) Patent No.: US 12,002,997 B1
(45) Date of Patent: Jun. 4, 2024

(54) ENERGY STORAGE DEVICE AND POWER CONSUMING DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Wenyang Zhou, Guangdong (CN); Yongfeng Xiong, Guangdong (CN); Jinqiang Chen, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/392,832

(22) Filed: Dec. 21, 2023

(30) Foreign Application Priority Data

Feb. 9, 2023 (CN) .......................... 202310091057.6

(51) Int. Cl.
*H01M 50/533* (2021.01)
*H01M 50/30* (2021.01)
*H01M 50/578* (2021.01)

(52) U.S. Cl.
CPC ....... *H01M 50/533* (2021.01); *H01M 50/394* (2021.01); *H01M 50/578* (2021.01)

(58) Field of Classification Search
CPC . H01M 50/533; H01M 50/394; H01M 50/578
See application file for complete search history.

(56) References Cited

U.S. PATENT DOCUMENTS

| 2013/0266830 A1* | 10/2013 | Byun | H01M 50/533 |
| | | | 429/61 |
| 2019/0379019 A1 | 12/2019 | Fukuda et al. | |
| 2020/0220134 A1* | 7/2020 | Guen | H01M 50/176 |

FOREIGN PATENT DOCUMENTS

| CN | 202839829 U | 3/2013 |
| CN | 106784570 A | 5/2017 |

(Continued)

OTHER PUBLICATIONS

WIPO, International Search Report and Written Opinion for International Patent Application No. PCT/CN2023075263, Sep. 20, 2023, 13 pages.

(Continued)

*Primary Examiner* — Amanda J Barrow
(74) *Attorney, Agent, or Firm* — IP Spring (57) ABSTRACT

A power consuming device includes an energy storage device. The energy storage device includes a supporter, a pole, a stimulus-response member, a connector, and an electrode assembly. The supporter has a first side and a second side opposite to the first side. The supporter defines a mounting hole and a vent hole. The mounting hole is spaced apart from the vent hole in a length direction of the supporter. The connector includes a first connecting part and a second connecting part. The first connecting part is connected to the second connecting part. The first connecting part is opposite to the second connecting part when the first connecting part is folded relative to the second connecting part. The first connecting part is connected to the pole. The second connecting part extends toward the vent hole and partially shields the vent hole in a thickness direction of the supporter.

16 Claims, 5 Drawing Sheets

(56) References Cited

FOREIGN PATENT DOCUMENTS

| | | |
|---|---|---|
| CN | 107968182 A | 4/2018 |
| CN | 108428820 A | 8/2018 |
| CN | 208127255 U | 11/2018 |
| CN | 110021728 A | 7/2019 |
| CN | 209312883 U | 8/2019 |
| CN | 211350705 U | 8/2020 |
| CN | 115377615 A | 11/2022 |
| CN | 115566375 A | 1/2023 |
| JP | 2019133856 A | 8/2019 |
| WO | 2023005005 A1 | 2/2023 |

OTHER PUBLICATIONS

CNIPA, First Office Action for corresponding Chinese Patent Application No. 202310091057.6, May 8, 2023, 17 pages.

CNIPA, Notification to Grant Patent Right for corresponding Chinese Patent Application No. 202310091057.6, May 26, 2023, 14 pages.

\* cited by examiner

ENERGY STORAGE DEVICE AND POWER CONSUMING DEVICE

CROSS-REFERENCE TO RELATED APPLICATION(S)

This application claims priority under 35 U.S.C. § 119(a) to Chinese Patent Application No. 202310091057.6, filed Feb. 9, 2023, the entire disclosure of which is hereby incorporated by reference.

TECHNICAL FIELD

The disclosure relates to the technical field of energy storage, and in particular, to an energy storage device and a power consuming device.

BACKGROUND

Energy storage devices are used to store energy and release energy when needed. Current energy storage devices are mainly secondary batteries that are rechargeable, such as lithium batteries or sodium batteries. Currently, a common secondary battery mainly includes a housing, a cell, and a cap assembly. The cell is received in the housing, the cap assembly encloses the housing, and a tab of the cell is connected to a pole on the cap assembly.

The tab and the pole are usually connected through a connector. The current energy storage device usually has a stimulus-response member that is configured to short-circuit an external circuit to avoid overcharging of the cell.

SUMMARY

The present disclosure is intended to provide an energy storage device and a power consuming device.

In a first aspect, the present disclosure provides an energy storage device. The energy storage device includes a supporter, a pole, a stimulus-response member, a connector, and an electrode assembly. The supporter has a first side and a second side opposite to each other. The supporter defines a mounting hole and a vent hole. The mounting hole is spaced apart from the vent hole in a length direction of the supporter. The pole is accommodated in the mounting hole. The stimulus-response member is disposed at the second side. The vent hole enables gas from the first side to flow through to the stimulus-response member. The connector is disposed at the first side. The connector includes a first connecting part and a second connecting part. The first connecting part is connected to the pole. The first connecting part is connected to the second connecting part. The first connecting part is opposite to the second connecting part when the first connecting part is folded relative to the second connecting part. The second connecting part extends toward the vent hole. The second connecting part partially shields the vent hole in a thickness direction of the supporter. At least a gap is defined between a side surface of the vent hole and the second connecting part in the length direction of the supporter and/or in a width direction of the supporter. The electrode assembly has a tab and the tab is connected to the second connecting part. In the thickness direction of the supporter, a ratio of an area of a portion of the vent hole not shielded by the second connecting part to an area of a portion of the vent hole shielded by the second connecting part ranges from 1/10 to 1/2.

In a second aspect, the present disclosure provides a power consuming device. The power consuming device includes the energy storage device of the first aspect. The energy storage device is configured to supply power to the power consuming device.

BRIEF DESCRIPTION OF THE DRAWINGS

In order to more clearly illustrate embodiments of the disclosure or technical solutions in the related art, the following is a brief introduction of accompanying drawings used in the description of the embodiments or the related art. The accompanying drawings described below are merely some embodiments of the disclosure, and those of ordinary skill in the art may also obtain other drawings according to these drawings.

Description of reference numbers: 10—housing; 20—cell; 21—positive tab; 22—negative tab; 30—supporter; 31—first side; 32—second side; 33—mounting hole; 34—vent hole; 341—first end point; 342—second end point; 343—third end point; 344—fourth end point; 35—grid; 40—negative pole; 41—pole body; 42—connecting flange; 43—sealing ring; 50—negative connector; 51—first connecting part; 52—second connecting part; 53—connecting section; 54—extending section; 541—first edge; 542—second edge; 531—third edge; 532—fourth edge; 511—fifth edge; 512—sixth edge; 61—first insulating adhesive film; 62—second insulating adhesive film; 70—stimulus-response member; 80—smooth aluminum sheet; 81—explosion-proof valve; 90—positive pole; 95—positive connector; 100—energy storage device; 700—power consuming device.

DETAILED DESCRIPTION

The following will describe technical solutions of embodiments of the present disclosure clearly and comprehensively with reference to accompanying drawings. Embodiments described herein are merely some embodiments, rather than all embodiments, of the disclosure. Based on the embodiments of the present disclosure, other embodiments obtained by those of ordinary skill in the art shall fall within the protection scope of the disclosure.

It may be noted that when a component is referred to as "fixed to" another component, the component may be directly positioned on the other component or an intermediate component may exist therebetween. When a component is referred to as "connected to" another component, the component may be directly connected to the other component or an intermediate component may exist therebetween simultaneously.

Unless otherwise defined, all technical and scientific terms used in the present disclosure have the same meaning as commonly understood by those skilled in the art of the present disclosure. The terms used in the detailed description in the present disclosure are for the purpose of describing embodiments only and are not intended to limit the disclosure. The term "and/or" in the present disclosure includes any and all combinations of one or more related listed items.

The following will describe in detail embodiments of the present disclosure with reference to the accompanying drawings. Various embodiments and features therein may be implemented in any combination with each other without conflict.

Currently, a stimulus-response member in an energy storage device may fail and thus cannot short-circuit an external circuit, resulting in loss of the overcharging protection function and insufficient safety.

The present disclosure is intended to provide an energy storage device and a power consuming device, so as to solve a problem of insufficient safety of the energy storage device.

In order to achieve the purpose of the disclosure, the present disclosure provides following technical solutions.

In a first aspect, the present disclosure provides an energy storage device. The energy storage device includes a supporter, a pole, a stimulus-response member, a connector, and an electrode assembly. The supporter has a first side and a second side opposite to each other. The supporter defines a mounting hole and a vent hole. The mounting hole is spaced apart from the vent hole in a length direction of the supporter. The pole is accommodated in the mounting hole. The stimulus-response member is disposed at the second side. The vent hole enables gas from the first side to flow through to the stimulus-response member. The connector is disposed at the first side. The connector includes a first connecting part and a second connecting part. The first connecting part is connected to the second connecting part. The first connecting part is opposite to the second connecting part when the first connecting part is folded relative to the second connecting part. The first connecting part is connected to the pole. The second connecting part extends toward the vent hole. The second connecting part partially shields the vent hole in a thickness direction of the supporter. The electrode assembly has a tab and the tab is connected to the second connecting part.

The second connecting part of the connector extends to the vent hole of the supporter, so that the second connecting part has a long size and thus can be stably connected and fixed to the tab. In addition, the second connecting part partially shields the vent hole in the thickness direction of the supporter and at least a part of the vent hole is not shielded by the second connecting part, which ensures that the gas generated from the cell can flow through the vent hole to the stimulus-response member at the second side, so that the stimulus-response member can be turned over to achieve the overcharging protection function, thereby improving the safety of the energy storage device.

In an embodiment, in the thickness direction of the supporter, a ratio of an area of a portion of the vent hole not shielded by the second connecting part to an area of a portion of the vent hole shielded by the second connecting part ranges from 1/10 to 1/2. The range of the ratio set herein facilitates appropriate sizes of the vent hole and the second connecting part and facilitates balanced proportions in the structure of the energy storage device. In addition, it can be ensured that the second connecting part has a greater size to connect with the tab and can serve to block welding slags, while enabling the gas to flow to the space below the stimulus-response member through the vent hole.

In an embodiment, a side surface of the vent hole includes a first end point and a second end point opposite to the first end point in the length direction of the supporter, where the first end point is close to the mounting hole, the second connecting part shields the first end point in the thickness direction of the supporter, and the second connecting part does not shield the second end point in the thickness direction of the supporter. As such, a gap is defined between the second connecting part and the second end point in the length direction of the supporter, which enables the gas to flow from the first side through the gap into the vent hole and then to the space below the stimulus-response member on the second side, thereby ensuring that the stimulus-response member works normally.

In an embodiment, the side surface of the vent hole further includes a third end point and a fourth end point opposite to the third end point in a width direction of the supporter. The second connecting part shields the third end point in the thickness direction of the supporter and the second connecting part does not shield the fourth end point in the thickness direction of the supporter. Alternatively, the second connecting part does not shield the third end point and does not shield the fourth end point in the thickness direction of the supporter. As such, a gap is defined between the second connecting part and the side surface of the vent hole in the width direction of the second connecting part, which enables the gas to flow from the gap into the vent hole and then to the space below the stimulus-response member, thus ensuring smoother gas flow.

In an embodiment, the second connecting part includes a connecting section and an extending section. The connecting section and the extending section are connected in the length direction of the supporter. The first connecting part is foldably connected to the connecting section. The extending section protrudes from the connecting section. The extending section partially shields the vent hole. Since the extending section partially shields the vent hole, it is only required to design the shape, structure, and size of the extending section to meet the necessary requirements, while the requirements for the first connecting part and the connecting section can be relaxed, thereby reducing the difficulty in design and manufacture and reducing the cost.

In an embodiment, a size of the extending section in the width direction of the supporter is a first width, and a size of the vent hole in the width direction of the supporter is a second width. A ratio of the first width to the second width ranges from 3/5 to 9/10. Since the ratio of the first width to the second width ranges from 3/5 to 9/10, the first width is smaller than the second width and the ratio is not too small. In this way, the extending section can have a wide width and thus can be effectively and stably connected to the negative tab while blocking the welding slags. Moreover, the extending section is not completely shield the vent hole, leaving a certain gap, which can ensure that the gas can flow through the gap into the vent hole and to the space below the stimulus-response member on the second side.

In an embodiment, the size of the extending section in the width direction of the supporter is the first width, and when the connecting part is folded relative to the connecting section, a size of a combination of the connecting section and the first connecting part in the width direction of the supporter is a third width. A ratio of the first width to the third width ranges from 3/5 to 9/10. The combination of the connecting section and the first connecting part has the third width when the first connecting part is folded relative to the connecting section, where the first width is smaller than the third width, so that the connecting section and the first connecting part have wider sizes to more stably connect with the negative tab and the negative pole, thereby improving the connection stability.

In an embodiment, the extending section has a first edge and a second edge opposite to the first edge in the width direction of the supporter, and the connecting section has a third edge and a fourth edge opposite to the third edge in the width direction of the supporter. The first edge is flush with the third edge, the fourth edge extends beyond the second edge, and the fourth edge is connected to the first connecting part. As such, the connecting section has a wider size than the extending section, so that the connecting section can be stably connected to the first connecting part. The second edge will be little affected when the first connecting part is folding over the fourth edge, so that the structure is stable and reliable. Moreover, when the combination of the connecting section and the extending section is connected to the negative tab, a more stable connection can be achieved due to the wider connecting section, so that the connection stability between the negative tab and the combination of the connecting section and the extending section can be improved.

In an embodiment, one end of the extending section away from the connecting section defines a chamfer. The chamfer facilitates a structure with smooth edge transition, which can avoid damage caused by scratching the cell or the like by a sharp angle structure of the extending section.

In an embodiment, the side surface of the vent hole is connected to a grid, and the grid separates the vent hole into multiple air holes. Configuration of the grid can strengthen the structural strength, thereby ensuring the structural stability.

In an embodiment, the first connecting part is integrated with the second connecting part. The integrated structure can strengthen the structural strength, without configuring additional connecting structures, thereby saving components and reducing costs.

In a second aspect, the present disclosure provides a power consuming device. The power consuming device includes the energy storage device as described in any one of various embodiments of the first aspect. The energy storage device is configured to supply power to the power consuming device. Safety can be improved by using the energy storage device of the disclosure.

Figure 1:
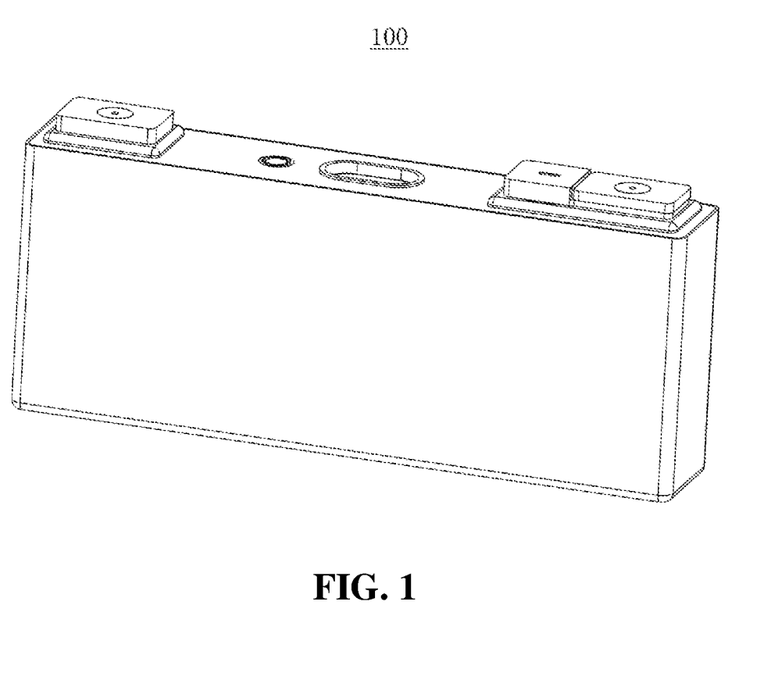
FIG. 1 a perspective view of an energy storage device in an embodiment.
Figure 2:
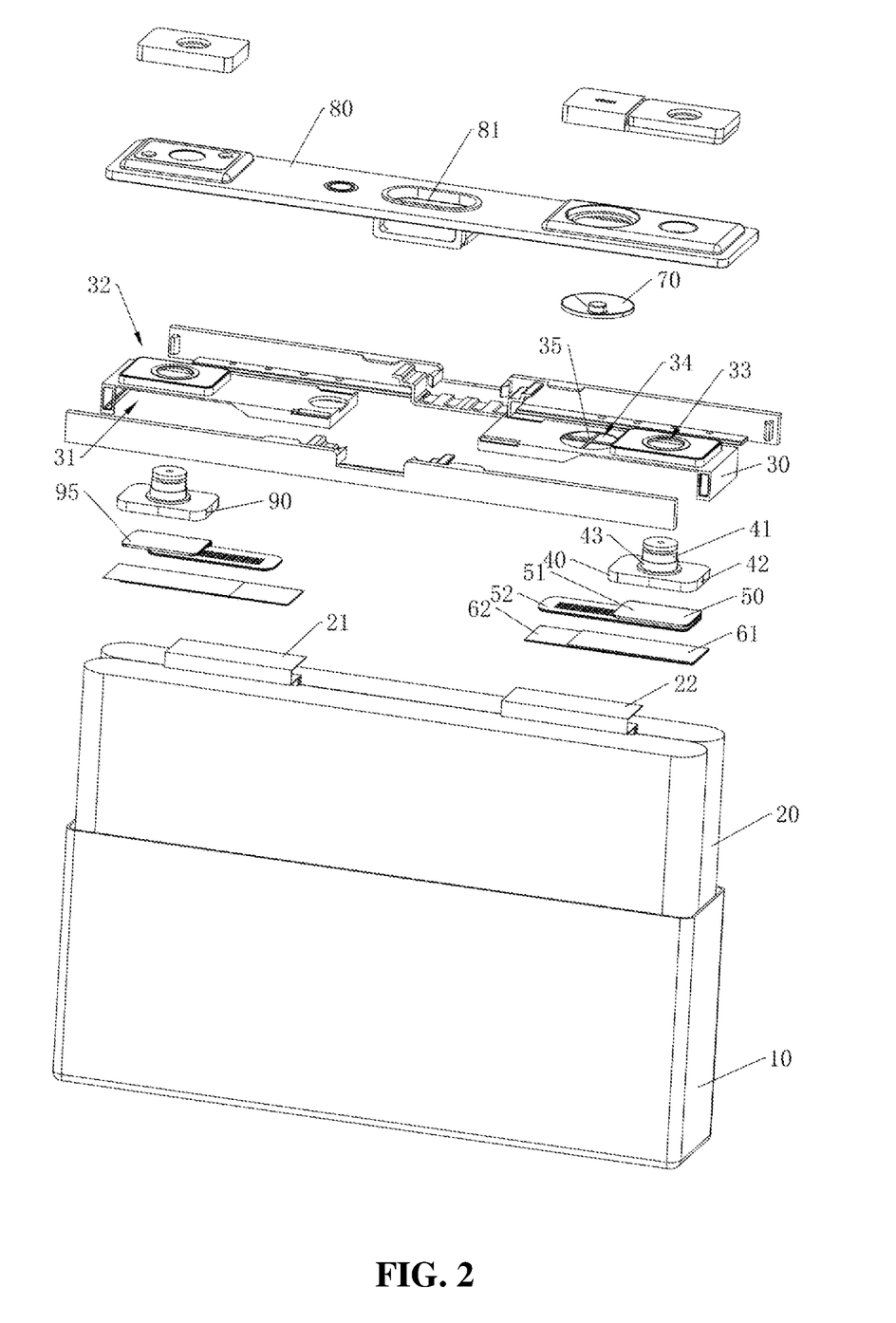
FIG. 2 is an exploded view of an energy storage device in an embodiment.

As illustrated in FIG. 1 and FIG. 2, embodiments of the present disclosure provide an energy storage device 100. The energy storage device 100 includes a housing 10, an electrode assembly, a connector, and a cap assembly.

The cap assembly includes a cell 20 and a tab. The tab includes a positive tab 21 and a negative tab 22. The cell 20 is accommodated in the housing 10. The cell 20 includes a positive electrode (not shown), a separator (not shown), and a negative electrode (not shown). The positive tab 21 is connected to the positive electrode, and the negative tab 22 is connected to the negative electrode.

The connector includes a positive connector 95 and a negative connector 50. The positive connector 95 is connected to the positive tab 21, and the negative connector 50 is connected to the negative tab 22.

The cap assembly includes a supporter 30, a positive pole 90, a negative pole 40, a smooth aluminum sheet 80, a stimulus-response member 70, and the like. The positive pole 90 is mounted and fixed to the supporter on the positive electrode side and the negative pole 40 is mounted and fixed to the supporter 30 on the negative electrode side. The positive pole 90 is connected to the positive connector 95, and the negative pole 40 is connected to the negative connector 50.

The structure of the positive electrode side is substantially the same as the structure of the negative electrode side. It may be noted that the stimulus-response member 70 is disposed at either the positive electrode side or the negative electrode side. The following describes the structure of the negative electrode side, taking the stimulus-response member 70 being disposed at the negative electrode side as an example. It may be understood that when the stimulus-response member 70 is disposed at the positive electrode side, the structure of the positive electrode side can be similar to the structure of the negative electrode side provided with the stimulus-response member 70.

The supporter 30 is made of an insulating material, and specifically may be a plastic material, such as polypropylene (PP) material. The supporter 30 has a first side 31 and a second side 32 opposite to the first side 31. The first side 31 is positioned facing towards the cell 20 and the second side 32 is positioned facing away from the cell 20. The supporter 30 is substantially in a plate shape, with a substantially rectangular plate surface. The supporter 30 has a length, a width, and a thickness. In the subsequent description of various structures, the extension direction of the length of the supporter 30 is a length direction, the extension direction of the width of the supporter 30 is a width direction, and the extension direction of the thickness of the supporter 30 is a thickness direction.

Figure 3:
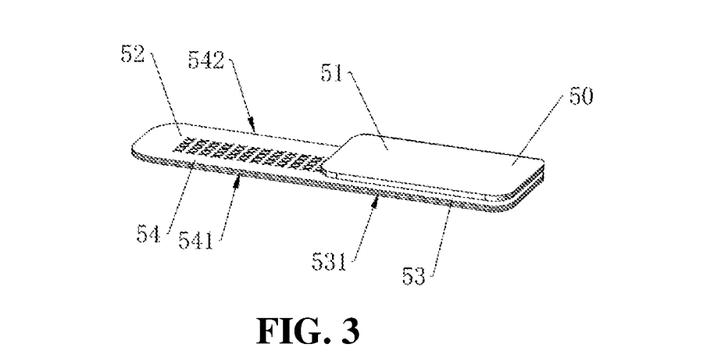
FIG. 3 is an exploded view of a supporter and a negative connector in an embodiment.

The supporter 30 defines a mounting hole 33 and a vent hole 34. The mounting hole 33 is spaced apart from the vent hole 34 in the length direction of the supporter 30. The mounting hole 33 and the vent hole 34 each are a via hole through the supporter 30 in the thickness direction and each may be circular holes. Optionally, the mounting hole 33 and the vent hole 34 each may also be a non-circular hole, such as elliptical hole, polygonal hole, and the like, without limitation. A line connecting a geometric center of the mounting hole 33 and a geometric center of the vent hole 34 may be parallel to the length direction of the supporter 30, or may be slightly skewed at an angle with respect to the length direction of the supporter 30.

Optionally, a side surface of the vent hole 34 is connected to a grid 35, and the grid 35 separates the vent hole 34 into multiple air holes. Specifically, the grid 35 may be composed of multiple strip-shaped structures. The grid 35 may be in the shape of "+", "米" (a shape of the Chinese character), and the like, without limitation. The strip-shaped structures of the grid 35 are connected and fixed to the side surface of the vent hole 34 at distal ends. The grid 35 may be in an integrated structure with the supporter 30, for example, the integrated structure formed by using integral molding process of injection molding. Configuring the grid 35 can strengthen the structural strength, thereby ensuring the structural stability.

The negative pole 40 is accommodated in the mounting hole 33. The negative pole 40 extends from the first side 31 into the mounting hole 33 and extends beyond the second side 32.

Optionally, the negative pole 40 includes a pole body 41 and a connecting flange 42. The pole body 41 is connected to the middle of the connecting flange 42. The pole body 41 extends through the mounting hole 33 beyond the second side 32. The connecting flange 42 is located on the first side 31. An outer peripheral surface of the pole body 41 may contact with an inner surface of the mounting hole 33. The connecting flange 42 has a size larger than the pole body 41. The connecting flange 42 may be attached to a surface of the supporter 30 on the first side. The connecting flange 42 serves to restrict the pole body 41 from extending further beyond the second side 32. The negative pole 40 is accommodated in the mounting hole 33, and the mounting hole 33 is sealed, so that the gas cannot leak from the mounting hole 33, thereby ensuring the sealing of the internal space of the energy storage device 100.

Optionally, a sealing ring 43 may be disposed on an outer peripheral surface of the negative pole 40 and/or the inner surface of the mounting hole 33. The sealing of the negative pole 40 and the mounting hole 33 can be implemented by the sealing ring 43.

The stimulus-response member 70 is disposed at the second side 32, and gas flows from the first side 31 to the stimulus-response member 70 through the vent hole 34. The stimulus-response member 70 is configured to, in response to an increase of pressure in the energy storage device 100, make a stimulus-response and thus deform so that the stimulus-response member 70 can make a stimulus-response and thus deform to contact with a metal conductive block, when the gas pressure inside the energy storage device 100 exceeds a predetermined threshold. In this case, the positive electrode assembly is short-circuited externally. Due to a strong short-circuiting current, fusing and clipping then occur at the stimulus-response member 70 and the bottom of the metal conductive block, so that the positive electrode assembly returns to be in an off-state, thereby preventing the energy storage device 100 from overcharging and further explosion.

Specifically, the supporter 30 is provided with a smooth aluminum sheet 80 on the second side 32. The smooth aluminum sheet 80 is connected to the supporter 30 to define a cavity that is communicate with the vent hole 34. The stimulus-response member 70 is disposed on the smooth aluminum sheet 80. When the overcharging of the cell 20 causes the gas pressure inside the energy storage device 100 to exceed the threshold, the gas flows through the vent hole 34 to a space below the stimulus-response member 70 (that is, the side of the stimulus-response member 70 toward the negative connector 50, the same below) on the second side 32, and pushes the stimulus-response member 70 to be turned over. After the stimulus-response member 70 is turned over, the negative pole 40 and the positive pole 90 are electrically connected. In this case, the energy storage device 100 is in a short-circuit state. The charging current flows directly from the positive pole 90 to the negative pole 40 through the smooth aluminum sheet 80, without flowing to the cell 20. Therefore, the overcharging protection can be achieved and the safety of charging of the cell 20 can be improved. When the cell 20 is normally charged but not overcharged, the stimulus-response member 70 will not be turned over, and the positive pole 90 and the negative pole 40 will not be directly electrically connected, thereby ensuring the normal charging and use of the energy storage device 100.

The stimulus-response member 70 is made of a metal conductive material and may have a movable film layer, a ribbed structure, and the like. The embodiments of the present disclosure do not limit the specific structure of the stimulus-response member 70, and any feasible structure is possible.

The smooth aluminum sheet 80 may further be provided with an explosion-proof valve 81. When a large amount of gas is generated due to abnormal thermal management occurring in the cell 20, the gas will burst through the explosion-proof valve 81 and leak out due to excessive air pressure, thereby avoiding accidents such as explosion caused by high pressure that is unable to be relieved.

Both the positive connector 95 and the negative connector 50 are made of metal. For example, the positive connector 95 is made of aluminum and the negative connector 50 is made of copper or aluminum copper alloy.

The negative connector 50 is disposed at the first side 31. The negative connector 50 includes a first connecting part 51 and a second connecting part 52. The first connecting part 51 is in a foldable connection to the second connecting part 52. The first connecting part 51 is opposite to the second connecting part 52 after folding. The foldable connection refers to that the two components are connected and one component is able to fold on the other component. The first connecting part 51 may be in the same plane as or have a large included angle with the second connecting part 52 before folding. The first connecting part 51 may be parallel to and in a different plane from the second connecting part 52 or may have a small included angle with the second connecting part 52 after folding.

The first connecting part 51 is connected to the negative pole 40. The connection manner may be welding, and specifically may be laser welding. The second connecting part 52 is connected and fixed to the negative tab 22. The connection manner may be welding, and specifically may be ultrasonic welding.

During assembly of the energy storage device 100, when the negative connector 50 is first set to an unfolded state, the cap assembly does not seal the housing 10 of the energy storage device 100. After the first connecting part 51 is welded and fixed to the negative pole 40 and the second connecting part 52 is welded and fixed to the negative tab 22, the first connecting part 51 is then folded on the second connecting part 52. Along with the folding, other components of the cap assembly, such as the supporter 30, the stimulus-response member 70, the negative pole 40, the smooth aluminum sheet 80, and the like, are turned over, until the first connecting part 51 and the second connecting part 52 are in a folded state, opposite to each other. Moreover, the cap assembly is aligned with the cell 20, so that the cap assembly covers the opening of the housing 10 to seal the cell 20.

Figure 4:
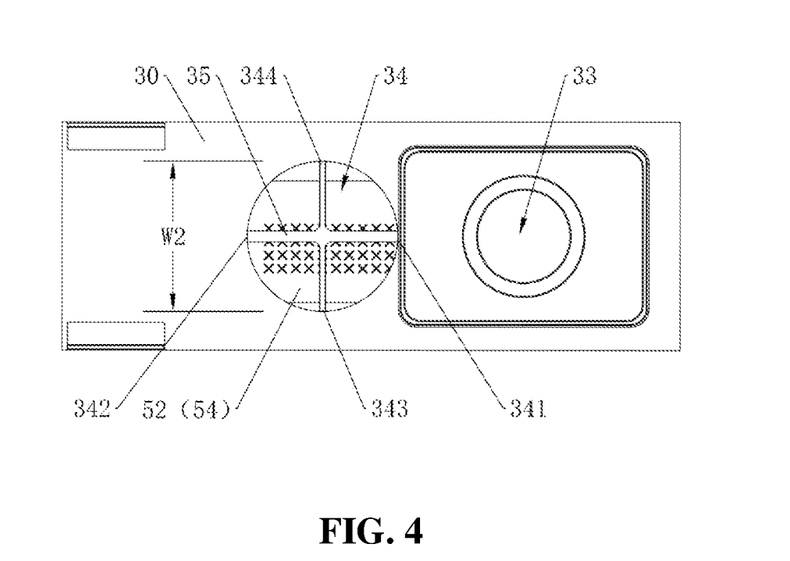
FIG. 4 is a vertical view of a supporter and a negative connector in an embodiment.

As illustrated in FIG. 2 to FIG. 4, the negative tab 22 generally has a long length. For stable connection with the negative tab 22, the length of the second connecting part 52 of the negative connector 50 may also be set to a large size. In the embodiment, the second connecting part 52 extends toward the vent hole 34 and partially shields the vent hole 34 in the thickness direction of the supporter 30.

In the embodiment, in the thickness direction of the supporter 30, at least a part of the vent hole 34 is not shielded by the second connecting part 52. In this way, at least a gap is defined between the side surface of the vent hole 34 and the second connecting part 52 in the length direction and/or the width direction of the supporter 30, which can prevent the second connecting part 52 from completely shielding the vent hole 34, and thus avoid a blockage which would block the gas from flowing from the first side 31 through the vent hole 34 to the space below the stimulus-response member 70 on the second side 32.

The above configuration has at least two advantages. In one advantage, a part of the vent hole 34 enables the gas to flow, that is, the second connecting part 52 does not completely shield the vent hole 34, so that the gas generated from the cell 20 can still flow to the space below the stimulus-response member 70 on the second side 32 through the gap between the inner surface of the vent hole 34 and the second connecting part 52, thus ensuring a basic overcharging protection function. In another advantage, welding slags will be generated when the first connecting part 51 is welded to the negative pole 40, as well as when the second connecting part 52 is welded to the negative tab 22. Since the second connecting part 52 shields part of the vent hole 34, the welding slags can be blocked to prevent the welding slags from falling from the vent hole 34 onto the stimulus-response member 70 and causing a short-circuit. The second connecting part 52 can also block the welding slags to reduce the welding slags falling into the cell 20, thereby avoiding the short-circuiting inside the cell 20.

Optionally, the first connecting part 51 is integrated with the second connecting part 52. Specifically, the first connecting part 51 and the second connecting part 52 may be made by processes such as cutting and folding of a metal sheet. The integrated structure can improve the structural strength, without configuring additional connecting structures, thereby saving components and reducing costs.

As illustrated in FIG. 2, in order to improve the effect of blocking the welding slag, a first insulating adhesive film 61 and a second insulating adhesive film 62 may further be configured. The first insulating adhesive film 61 is adhered to a surface of the first connecting part 51 toward the second connecting part 52, and the second insulating adhesive film 62 is adhered to a surface of the second connecting part 52 toward the first connecting part 51. The first insulating adhesive film 61 partially shields the vent hole 34 in the thickness direction of the supporter 30, so that when the negative connector 50 is not yet folded, the welding slags generated by the welding is shielded by the first insulating adhesive film 61 to avoid falling into the vent hole 34, and the welding slags falling into the cell 20 can also be reduced. The second insulating film 62 at least partially shields the vent hole 34 in the thickness direction of the supporter 30, which can also prevent the welding slags from falling.

It may be understood that either the first insulating adhesive film 61 or the second insulating adhesive film 62 may be configured, or both the first insulating adhesive film 61 and the second insulating adhesive film 62 may be configured. In either case, it is ensured at least that the gas can enter the vent hole 34. That is, while shielding the vent hole 34, the first insulating adhesive film 61 and the second insulating adhesive film 62 leave at least a gap for the gas to enter the vent hole 34.

The first insulating adhesive film 61 and the second insulating adhesive film 62 may be of different colors to facilitate quick identification of a correct configuration. The first insulating adhesive film 61 and the second insulating adhesive film 62 may have adhesiveness and may be directly adhered and fixed to the negative connector 50.

It may be understood that the above is described in terms of the negative electrode side only. When the stimulus-response member 70 is disposed at the positive electrode side, the structures of the positive connector 95, the supporter and the like on the positive electrode side may be configured with reference to the negative electrode side, which will not be described in detail.

According to the energy storage device 100 of the embodiments of the present disclosure, the second connecting part 52 of the connector extends to the vent hole 34 of the supporter 30, so that the second connecting part 52 has a long size and thus can be stably connected and fixed to the negative tab 22. In addition, the second connecting part 52 partially shields the vent hole 34 in the thickness direction of the supporter 30 and at least part of the vent hole 34 is not shielded by the second connecting part 52, which ensures that the gas generated from the cell 20 can flow to the space below the stimulus-response member 70 on the second side 32 through the vent hole 34, so that the stimulus-response member 70 can be turned over to achieve the overcharging protection function, thereby improving the safety of the energy storage device 100.

Optionally, in the thickness direction of the supporter 30, a ratio of the area of a portion of the vent hole 34 not shielded by the second connecting part 52 to the area of a portion of the vent hole 34 shielded by the second connecting part 52 ranges from 1/10 to 1/2. Specifically, the ratio may be 1/10, 1/9, 1/8, 1/7, 1/6, 1/5, 1/4, 1/3, 1/2, and the like. The range of the ratio set herein facilitates appropriate sizes of the vent hole 34 and the second connecting part 52 and facilitates balanced proportions in the structure of the energy storage device 100. In addition, it can be ensured that the second connecting part 52 has a larger size to connect with the tab and can serve to block the welding slag, while enabling the gas to enter the space below the stimulus-response member 70 through the vent hole 34.

In an embodiment, as illustrated in FIG. 3 and FIG. 4, the side surface of the vent hole 34 includes a first end point 341 and a second end point 342 opposite to the first end point 341 in the length direction of the supporter 30. The first end point 341 is close to the mounting hole 33. The second connecting part 52 shields the first end point 341 in the thickness direction of the supporter 30. The second connecting part 52 does not shield the second end point 342 in the thickness direction of the supporter 30, so that a gap is defined between the second connecting part 52 and the second end point 342 in the length direction of the supporter 30.

Specifically, the first end point 341 and the second end point 342 are each a point on the side surface of the vent hole 34. Optionally, the first end point 341 is a point where a line connecting a geometric center of the mounting hole 33 and the geometric center of the vent hole 34 intersects the side surface of the vent hole 34. The second end point 342 is a point where an extension of the line connecting the geometric center of the mounting hole 33 and the geometric center of the vent hole 34 intersects the side surface of the vent hole 34, opposite to the first end point 341. The line connecting the first end point 341, the geometric center of the vent hole 34, and the second end point 342 is a straight line. In embodiments where the vent hole 34 is a circular hole, the line connecting the first end point 341 and the second end point 342 is a diameter of the vent hole 34.

The second connecting part 52 is substantially shaped as a rectangular sheet. The length direction of the second connecting part 52 may be the same as the length direction of the supporter 30, the width direction of the second connecting part 52 may be the same as the width direction of the supporter 30, and the thickness direction of the second connecting part 52 may be the same as the thickness direction of the supporter 30, which will be used as an example in the following description. It may be understood that the direction of the second connecting part 52 may be slightly skewed with respect to the corresponding direction of the supporter 30.

The second connecting part 52 extends in a direction from the first end point 341 toward the second end point 342, and the end of the second connecting part 52 away from the negative pole 40 in the length direction is positioned between the first end point 341 and the second end point 342, so that a gap is defined between the second end point 342 and the second connecting part 52 in the length direction of the supporter 30.

The second connecting portion 52 does not shield the second end point 342 in the thickness direction of the supporter 30, so that a gap is defined between the second end point 342 and the second connecting portion 52 in the length direction of the supporter 30, which enables the gas to flow from the first side 31 through the gap into the vent hole 34 and then to the space below the stimulus-response member 70 on the second side 32.

It may be understood that the gap between the second connecting part 52 and the second end point 342 in the length direction of the supporter 30 may be set as needed. A larger gap enables the gas to pass through more easily, and a smaller gap provides a better shielding effect so that the welding slag does not easily fall onto the stimulus-response member 70 through the gap. The specific size of the gap is not limited.

In an embodiment, as illustrated in FIG. 3 and FIG. 4, the side surface of the vent hole 34 further includes a third end point 343 and a fourth end point 344 opposite to the third end point 343 in the width direction of the supporter 30. The second connecting part 52 shields the third end point 343 in the thickness direction of the supporter 30 and the second connecting part 52 does not shield the fourth end point 344 in the thickness direction of the supporter 30, so that a gap is defined between the second connecting part 52 and the fourth end point 344 in the width direction of the supporter 30. Alternatively, the second connecting part 52 does not shield the third end point 343 and does not shield the fourth end point 344 in the thickness direction of the supporter 30, so that a gap is defined between the second connecting part 52 and the third end point 343 and a gap is defined between the second connecting part 52 and the fourth end point 344, in the width direction of the supporter 30.

Specifically, similarly to the first end point 341 and the second end point 342, the third end point 343 and the fourth end point 344 are each a point on the side surface of the vent hole 34. Optionally, a line connecting the third end point 343 and the fourth end point 344 passes through the geometric center of the vent hole 34. Optionally, the line connecting the third end point 343 and the fourth end point 344 is perpendicular to the line connecting the first end point 341 and the second end point 342. Optionally, the line connecting the third end point 343 and the fourth end point 344 is parallel to the width direction of the supporter 30.

As described above, in the length direction, the second connecting part 52 extends in a direction from the first end point 341 to the second end point 342. On this basis, the width of the second connecting part 52 is set to make two opposite edges of the second connecting part 52 in the width direction have certain relationships with the third end point 343 and the fourth end point 344. Different shielding effects may be provided by setting such relationships.

Specifically, in a first relationship, one edge of the second connecting part 52 in the width direction is spaced apart from the third end point 343 by a distance, so that a gap is defined between the second connecting part 52 and the third end point 343 in the width direction of the supporter 30. In addition, the other edge of the second connecting part 52 in the width direction extends beyond the fourth end point 344, so that the second connecting part 52 shields the fourth end point 344 in the thickness direction of the supporter 30. In a second relationship, one edge of the second connecting part 52 in the width direction is spaced apart from the third end point 343 by a distance, so that a gap is defined between the second connecting part 52 and the third end point 343 in the width direction of the supporter 30. In addition, the other edge of the second connecting part 52 in the width direction is spaced apart from the fourth end point 344 by a distance, so that a gap is defined between the second connecting part 52 and the fourth end point 344 in the width direction of the supporter 30.

It may be understood that the third end point 343 and the fourth end point 344 are interchangeable, that is, in the first relationship, there may be a gap between either side of the second connecting part 52 in the width direction and the side surface of the vent hole 34, or there may be gaps between each of two sides and the side surface of the vent hole 34.

The gap is defined between the second connecting part 52 and the side surface of the vent hole 34 in the width direction, which enables the gas to flow from the gap into the vent hole 34 and then to the space below the stimulus-response member 70, thus ensuring smoother gas flow.

It may be understood that the size of the gap between the second connecting part 52 and the side surface of the vent hole 34 in the width direction is not limited and can be set as needed.

Figure 5:
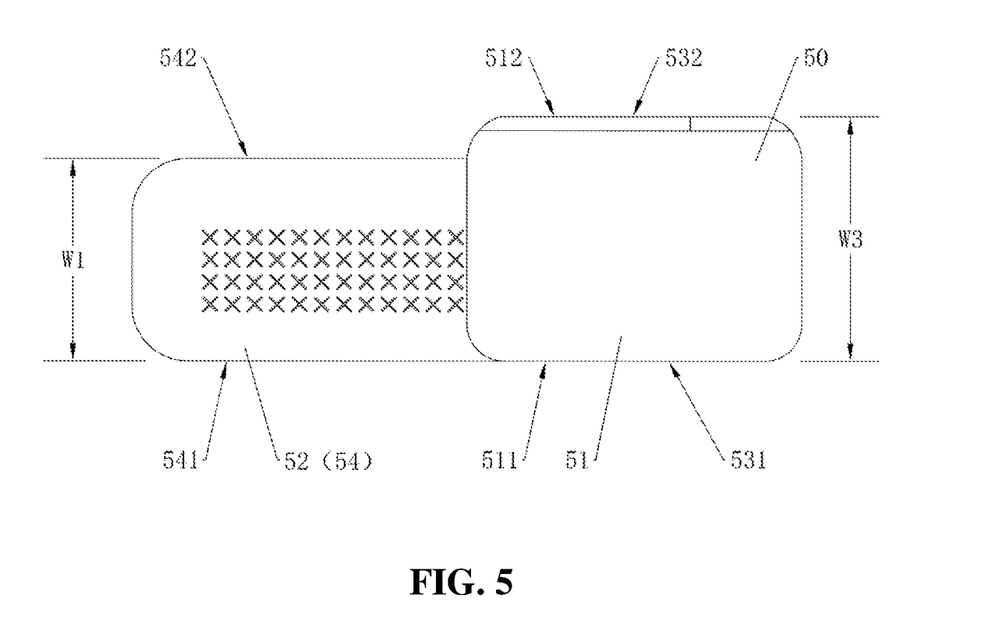
FIG. 5 is a vertical view of a negative connector in an embodiment.

In an embodiment, as illustrated in FIG. 3 to FIG. 5, the second connecting part 52 includes a connecting section 53 and an extending section 54. The connecting section 53 is connected to the extending section 54 in the length direction of the supporter 30. The first connecting part 51 is foldably connected to the connecting section 53. The extending section 54 protrudes from the connecting section 53. The extending section 54 partially shields the vent hole 34. At least a part of the vent hole 34 is not shielded by the extending section 54, so that at least a gap is defined between the side surface of the vent hole 34 and the extending section 54.

Specifically, the connecting section 53 does not shield the vent hole 34 in the thickness direction of the supporter 30. The shape and structure of the connecting section 53 can be designed without taking into account the limitation on shielding the vent hole 34, and the connecting section 53 can be configured as a suitable shape and structure as needed. Similarly, the first connecting part 51 does not shield the vent hole 34 in the thickness direction of the supporter 30, and the first connecting part 51 can also be configured as a suitable shape and structure as needed. The extending section 54 needs to partially shield the vent hole 34 in the thickness direction of the supporter 30 to make at least a part of the vent hole 34 not shielded by the extending section 54, and thus the extending section 54 needs to be designed to enable the gas to flow through the gap between the extending section 54 and the side surface of the vent hole 34 while shielding the vent hole 34.

Therefore, the extending section 54 partially shields the vent hole 34, so that it is only required to design the shape, structure, size, and the like of the extending section 54 that meets the necessary requirement, while the requirement can be relaxed for the first connecting part 51 and the connecting section 53, thereby reducing the difficulty in design and manufacture and reducing the cost.

Optionally, as illustrated in FIG. 3 to FIG. 5, a size of the extending section 54 in the width direction of the supporter 30 is a first width W1, and a maximum size of the vent hole 34 in the width direction of the supporter 30 is a second width W2. A ratio of the first width W1 to the second width W2 ranges from 3/5 to 9/10.

Specifically, the extending section 54 may be in the shape of a rectangular sheet. A length direction of the extending section 54 is the same as the length direction of the supporter 30, a width direction of the extending section 54 is the same as the width direction of the supporter 30, and a thickness direction of the extending section 54 is the same as the thickness direction of the supporter 30. One end of the extending section 54 in the length direction is connected to the connecting section 53, and the other end of the extending section 54 in the length direction extends toward and shields the vent hole 34.

The extending section 54 has a first edge 541 and a second edge 542 opposite to the first edge 541 in the width direction of the supporter 30. Both the first edge 541 and the second edge 542 extend along the length direction of the supporter 30. The first width W1 is a length of a perpendicular line between the first edge 541 and the second edge 542.

When the vent hole 34 is a circular hole, the second width W2 is the diameter of the vent hole 34.

It may be understood that the extending section 54 may also have other shapes and the vent hole 34 may also have other shapes. For the extending section 54 and the vent hole 34 of any shape, the first width W1 may be a length of a longest straight line among any straight lines drawn between the first edge 541 and the second edge 542 and parallel to the width direction of the supporter 30, and the second width W2 may be a length of a longest line among any straight lines drawn between the side surface of the vent hole 34 and parallel to the width direction of the supporter 30.

The ratio of the first width W1 to the second width W2 ranges from 3/5 to 9/10, where first width W1 is smaller than the second width W2 and the ratio is not too small. In this way, the extending section 54 has a wide width, and thus can be effectively and stably connected to the negative tab 22 while blocking the welding slag. Moreover, the extending section 54 does not completely shield the vent hole 34, leaving a certain gap, which can ensure that the gas can flow through the gap into the vent hole 34 and to the space below the stimulus-response member 70 on the second side 32. Optionally, the ratio of the first width W1 to the second width W2 may be 3/5, 7/10, 4/5, 9/10, and the like, without limitation, and the specific values of the first width W1 and the second width W2 are not limited.

Optionally, as illustrated in FIG. 3 to FIG. 5, a size of the extending section 54 in the width direction of the supporter 30 is a first width W1, and when the first connecting part 51 is folded relative to the connecting section 53, a size of a combination of the connecting section 53 and the first connecting part 51 in the width direction of the supporter 30 is a third width W3. A ratio of the first width W1 to the third width W3 ranges from 3/5 to 9/10.

Specifically, according to the above description, the shapes, sizes, structures, and the like of the connecting section 53 and the first connecting part 51 may be configured appropriately as needed, without considering the limitation on shielding the vent hole 34. In the embodiment, the whole formed by the connecting section 53 and the first connecting part 51 after folded relative to each other has the third width W3. The first width W1 is smaller than the third width W3, so that the whole formed by the connecting section 53 and the first connecting part 51 has a wider size to more stably connect with the negative tab 22 and the negative pole 40, thereby improving the connection stability.

Both the connecting section 53 and the first connecting part 51 may be in the shape of a sheet, and the shape may be a rectangle, a square, and the like, without limitation. The definition of the third width W3 may be similar to the definition of the first width W1 as described previously and will not be repeated herein.

It may be understood that the connecting section 53 and the first connecting part 51 may have the same or different sizes in the width direction of the supporter 30. In any case, the combination of the connecting section 53 and the first connecting part 51 after the two are folded relative to each other has the third width W3.

Optionally, the ratio of the first width W1 to the third width W3 may be 3/5, 7/10, 4/5, 9/10, and the like, without limitation, and the specific values of the first width W1 and the third width W3 are not limited.

Optionally, as illustrated in FIG. 3 to FIG. 5, the connecting section 53 has a third edge 531 and a fourth edge 532 opposite to the third edge 531 in the width direction of the supporter 30. The first edge 541 is flush with the third edge 531, and the fourth edge 532 extends beyond the second edge 542. The fourth edge 532 is foldably connected to the first connecting part 51.

The first edge 541 is flush with the third edge 531 and the fourth edge 532 extends beyond the second edge 542. As such, the connecting section 53 has a wider size than the extending section 54, so that the connecting section 53 can be in a stable foldable connection to the first connecting part 51. The second edge 542 will be little affected when the first connecting part 51 is folding over the fourth edge 532, so that the structure is stable and reliable. Moreover, when the combination of the connecting section 53 and the extending section 54 is connected to the negative tab 22, a more stable effect can be achieved due to the wider connecting section, so that the connection stability between the negative tab 22 and the combination of the connecting section 53 and the extending section 54 can be improved.

Optionally, the first connecting part 51 has a fifth edge 511 and a sixth edge 512 opposite to the fifth edge 511 in the width direction of the supporter 30. After the negative connector 50 is folded, the fifth edge 511 is flush with the third edge 531 and the sixth edge 512 is flush with the fourth edge 532. Optionally, the sixth edge 512 and the fourth edge 532 are the same edge.

Figure 6:
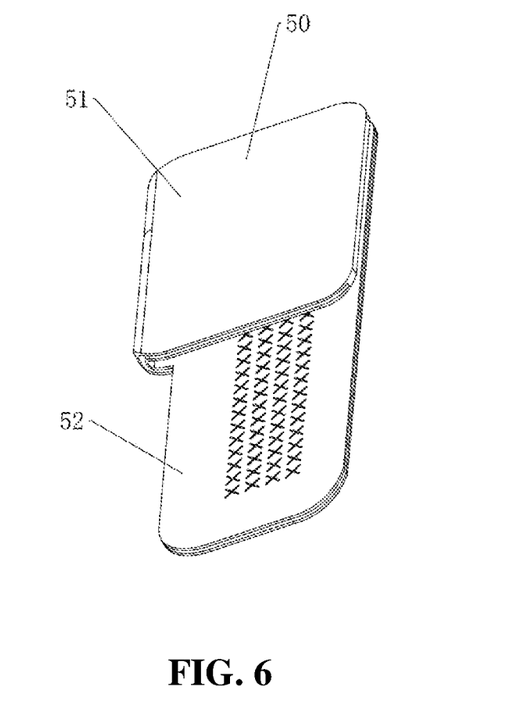
FIG. 6 is an isometric view of a negative connector in an embodiment.

The shape of the first connecting part 51 is substantially the same as the shape of the connecting section 53, as illustrated in FIG. 5 and FIG. 6. After the first connecting part 51 is folded relative to the second connecting part 52, as illustrated in FIG. 5, the shapes of the first connecting part 51 and the connecting section 53 are essentially the same when viewed from above, that is, an orthographic projection of the first connecting part 51 on the second connecting part 52 coincides with the connecting section 53. This can simplify the design and reduce the difficulty in manufacture.

Optionally, as illustrated in FIG. 3, FIG. 5, and FIG. 6, one end of the extending section 54 away from the connecting section 53 defines a chamfer. The chamfer facilitates a structure with smooth edge transition, which can avoid damage caused by scratching the structure such as the cell or the like by a sharp angle structure of the extending section.

Figure 7:
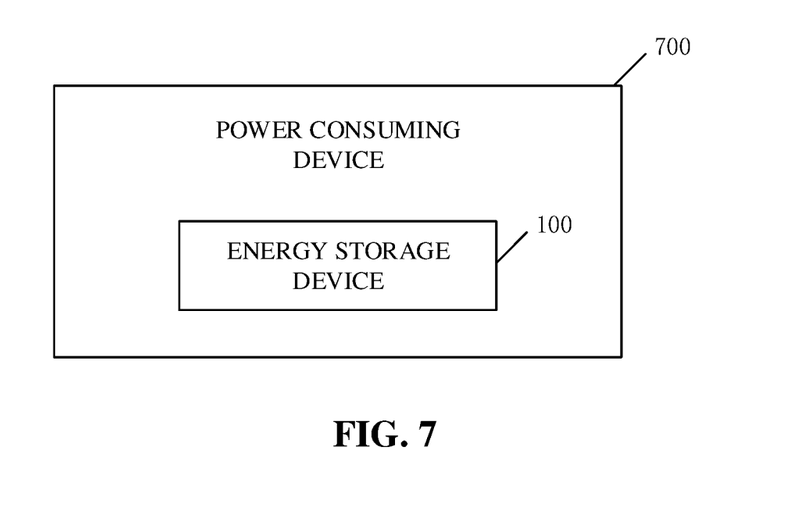
FIG. 7 is a schematic block diagram of a power consuming device in an embodiment.

As illustrated in FIG. 1 to FIG. 6, based on the above energy storage device 100 in the embodiments of the present disclosure, the embodiments of the present disclosure further provide a power consuming device 700. As illustrated in FIG. 7, the power consuming device 700 includes the energy storage device 100 in the embodiments of the present disclosure. The energy storage device 100 is configured to supply power to the power consuming device 700.

The power consuming device 700 may be an electric vehicle, a battery exchange station, and the like, which is not limited herein.

Safety can be improved by using the energy storage device 100 of the present disclosure.

In description of the disclosure, it may be understood that locations or positional relationships indicated by terms such as "center", "on", "under", "left", "right", "vertical", "horizontal", "in", "out", and the like are locations or positional relationship based on accompanying drawings and are only for the convenience of description and simplicity, rather than explicitly or implicitly indicate that devices or components referred to herein must have a certain direction or be configured or operated in a certain direction and therefore cannot be understood as limitations to the disclosure.

The above embodiments are only some embodiments of this disclosure, and cannot be used to limit the scope of this disclosure. Those of ordinary skill in the art can understand all or a part of the process to realize the above embodiments of the disclosure, and the equivalent changes made in accordance with the claims of this disclosure still belong to the scope of the disclosure.

What is claimed is:

1. An energy storage device, comprising:
    a supporter having a first side and a second side opposite to each other, the supporter defining a mounting hole and a vent hole, the mounting hole being spaced apart from the vent hole in a length direction of the supporter;
    a pole accommodated in the mounting hole;
    a stimulus-response member disposed at the second side, wherein the vent hole enables gas from the first side to flow through to the stimulus-response member;
    a connector disposed at the first side, the connector comprising a first connecting part and a second connecting part, wherein
        the first connecting part is connected to the pole, the first connecting part is connected to the second connecting part, the first connecting part is opposite to the second connecting part when the first connecting part is folded relative to the second connecting part, the second connecting part extends toward the vent hole, the second connecting part partially shields the vent hole in a thickness direction of the supporter, and at least a gap is defined between a side surface of the vent hole and the second connecting part in the length direction of the supporter and/or in a width direction of the supporter; and
    an electrode assembly having a tab, the tab being connected to the second connecting part, wherein
    in the thickness direction of the supporter, a ratio of an area of a portion of the vent hole not shielded by the second connecting part to an area of a portion of the vent hole shielded by the second connecting part ranges from 1/10 to 1/2.

2. The energy storage device of claim 1, wherein the side surface of the vent hole comprises a first end point and a second end point opposite to the first end point in the length direction of the supporter, wherein
    the first end point is close to the mounting hole, the second connecting part shields the first end point in the thickness direction of the supporter, and the second connecting part does not shield the second end point in the thickness direction of the supporter.

3. The energy storage device of claim 1, wherein the side surface of the vent hole further comprises a third end point and a fourth end point opposite to the third end point in the width direction of the supporter, wherein
    the second connecting part shields the third end point in the thickness direction of the supporter, and the second connecting part does not shield the fourth end point in the thickness direction of the supporter; or
    the second connecting part does not shield the third end point and the fourth end point in the thickness direction of the supporter.

4. The energy storage device of claim 1, wherein the second connecting part comprises a connecting section and an extending section, the connecting section is connected to the extending section in the length direction of the supporter, the first connecting part is foldably connected to the connecting section, the extending section protrudes from the connecting section, and the extending section partially shields the vent hole.

5. The energy storage device of claim 4, wherein a size of the extending section in the width direction of the supporter is a first width, a maximum size of the vent hole in the width direction of the supporter is a second width, and a ratio of the first width to the second width ranges from 3/5 to 9/10.

6. The energy storage device of claim 4, wherein a size of the extending section in the width direction of the supporter is a first width, a size of a combination of the connecting section and the first connecting part in the width direction of the supporter, when the first connecting part is folded relative to the connecting section, is a third width, and a ratio of the first width to the third width ranges from 3/5 to 9/10.

7. The energy storage device of claim 6, wherein the extending section has a first edge and a second edge opposite to the first edge in the width direction of the supporter, the connecting section has a third edge and a fourth edge opposite to the third edge in the width direction of the supporter, the first edge is flush with the third edge, the fourth edge extends beyond the second edge, and the fourth edge is connected to the first connecting part.

8. The energy storage device of claim 4, wherein one end of the extending section away from the connecting section defines a chamfer.

9. A power consuming device, comprising an energy storage device configured to supply power to the power consuming device, wherein the energy storage device comprising:
    a supporter having a first side and a second side opposite to each other, the supporter defining a mounting hole and a vent hole, the mounting hole being spaced apart from the vent hole in a length direction of the supporter;
    a pole accommodated in the mounting hole;
    a stimulus-response member disposed at the second side, wherein the vent hole enables gas from the first side to flow through to the stimulus-response member;
    a connector disposed at the first side, the connector comprising a first connecting part and a second connecting part, wherein
        the first connecting part is connected to the pole, the first connecting part is connected to the second connecting part, the first connecting part is opposite to the second connecting part when the first connecting part is folded relative to the second connecting part, the second connecting part extends toward the vent hole, the second connecting part partially shields the vent hole in a thickness direction of the supporter, and at least a gap is defined between a side surface of the vent hole and the second connecting part in the length direction of the supporter and/or in a width direction of the supporter; and
    an electrode assembly having a tab, the tab being connected to the second connecting part, wherein
    in the thickness direction of the supporter, a ratio of an area of a portion of the vent hole not shielded by the second connecting part to an area of a portion of the vent hole shielded by the second connecting part ranges from 1/10 to 1/2.

10. The power consuming device of claim 9, wherein the side surface of the vent hole comprises a first end point and a second end point opposite to the first end point in the length direction of the supporter, wherein
    the first end point is close to the mounting hole, the second connecting part shields the first end point in the thickness direction of the supporter, and the second connecting part does not shield the second end point in the thickness direction of the supporter.

11. The power consuming device of claim 9, wherein the side surface of the vent hole further comprises a third end point and a fourth end point opposite to the third end point in the width direction of the supporter, wherein the second connecting part shields the third end point in the thickness direction of the supporter, and the second connecting part does not shield the fourth end point in the thickness direction of the supporter; or the second connecting part does not shield the third end point and the fourth end point in the thickness direction of the supporter.

12. The power consuming device of claim 9, wherein the second connecting part comprises a connecting section and an extending section, the connecting section is connected to the extending section in the length direction of the supporter, the first connecting part is foldably connected to the connecting section, the extending section protrudes from the connecting section, and the extending section partially shields the vent hole.

13. The power consuming device of claim 12, wherein a size of the extending section in the width direction of the supporter is a first width, a maximum size of the vent hole in the width direction of the supporter is a second width, and a ratio of the first width to the second width ranges from 3/5 to 9/10.

14. The power consuming device of claim 12, wherein a size of the extending section in the width direction of the supporter is a first width, a size of a combination of the connecting section and the first connecting part in the width direction of the supporter, when the first connecting part is folded relative to the connecting section, is a third width, and a ratio of the first width to the third width ranges from 3/5 to 9/10.

15. The power consuming device of claim 14, wherein the extending section has a first edge and a second edge opposite to the first edge in the width direction of the supporter, the connecting section has a third edge and a fourth edge opposite to the third edge in the width direction of the supporter, the first edge is flush with the third edge, the fourth edge extends beyond the second edge, and the fourth edge is connected to the first connecting part.

16. The power consuming device of claim 12, wherein one end of the extending section away from the connecting section defines a chamfer.

* * * * *